(12) United States Patent
Johnson et al.

(10) Patent No.: US 8,566,067 B2
(45) Date of Patent: Oct. 22, 2013

(54) METHOD OF MODELING THE SOCIO-SPATIAL DYNAMICS OF EXTREME URBAN HEAT EVENTS

(76) Inventors: Daniel P. Johnson, Greenfield, IN (US); Jeffrey S. Wilson, Avon, IN (US)

(*) Notice: Subject to any disclaimer, the term of this patent is extended or adjusted under 35 U.S.C. 154(b) by 596 days.

(21) Appl. No.: 12/474,342

(22) Filed: May 29, 2009

(65) Prior Publication Data

US 2010/0305913 A1    Dec. 2, 2010

(51) Int. Cl.
G06F 7/60 (2006.01)
G06F 17/10 (2006.01)

(52) U.S. Cl.
USPC .............................................. 703/2

(58) Field of Classification Search
USPC .............................................. 703/2
See application file for complete search history.

(56) References Cited

U.S. PATENT DOCUMENTS 7,249,007 B1 *   7/2007   Dutton ............................... 703/2

OTHER PUBLICATIONS

Anthony C. Gatrell, Trevor C. Bailey, Peter J. Diggle and Barry S. Rowlingson, 1996, Spatial Point Pattern Analysis and Its Application in Geographical Epidemiology, Transactions of the Institute of British Geographers, New Series, vol. 21, No. 1 (1996), pp. 256-274.*

Daniel P. Johnson, Jeffrey S. Wilson, The socio-spatial dynamics of extreme urban heat events: The case of heat-related deaths in Philadelphia, Applied Geography, vol. 29, Issue 3, Jul. 2009, pp. 419-434.*

Medina-Ramón M, Zanobetti A, Cavanagh DP, Schwartz J., Extreme temperatures and mortality: assessing effect modification by personal characteristics and specific cause of death in a multi-city case-only analysis, Environ Health Perspect. Sep. 2006;114(9):1331-6.*

Kim, Yeon-Hee; Baik, Jong-Jin, Jun. 2002, Maximum Urban Heat Island Intensity in Seoul, Journal of Applied Meteorology, vol. 41, Issue 6, pp. 651-659.*

Shakoor Hajat, Ben G. Armstrong, Nelson Gouveia and Paul Wilkinson, Sep. 2005, Mortality Displacement of Heat-Related Deaths: A Comparison of Delhi, São Paulo, and London, Epidemiology, vol. 16, No. 5, pp. 613-620.*

Levine, et al., "Spatial Analysis of Honolulu Motor Vehicle Crashes: II. Zonal Generators", Accid. Anal. and Prev., vol. 27, No. 5, pp. 675-685, 1995.

* cited by examiner

Primary Examiner — Mary C Jacob
Assistant Examiner — Aniss Chad
(74) Attorney, Agent, or Firm — Brannon Sowers & Cracraft PC

(57) ABSTRACT

A method of coupling surface urban heat island measures with socio-economic indicators of vulnerability to create improved spatially specific models to assist public health professionals in predicting extreme heat events mortality in urban environments. The method includes utilizing landsat TM imagery for the measuring of the urban heat island intensity levels and a spatial analysis of the variables in question.

3 Claims, 4 Drawing Sheets

METHOD OF MODELING THE SOCIO-SPATIAL DYNAMICS OF EXTREME URBAN HEAT EVENTS

GRANT STATEMENT

This invention technology was made with government support under Contract No. 200-2006-15969 from the Center for Disease Control (CDC). The Government has certain rights to this invention.

TECHNICAL FIELD OF THE INVENTION

The present invention relates generally to the field of mathematics, and, more particularly, to the mathematical modeling of the interaction of society and environmental events.

BACKGROUND OF THE INVENTION

Extreme heat is a prolific weather-related killer in the United States as well as the rest of the world. Notable extreme heat events (EHE's) within the last two decades include a seven day period in Philadelphia, Pa., in July of 1993 accounting for 118 deaths and a less than seven day period Chicago, Ill., in July of 1995 accounting for 700 deaths. Outside of North America, France experienced an EHE in the summer of 2003 that accounted over tens of thousands of deaths. Thus, heat-related morbidity and mortality are among the primary health concerns expected to increase as a function of climate change.

There is significant disparity in the populations involved in heat-related morbidity/mortality. Generally, various social characteristics have been associated with urban disasters. Those sufferers of poverty, those with poor education, those designated by minority status, the very young, and the elderly are groups identified as disproportionally impacted by urban disasters. However, the distribution of vulnerability to EHEs among the various groups, as defined by the social characteristics listed above and various combinations of the same, is largely unknown. Furthermore, the interaction between the various social characteristics and EHEs is not simple, and is further exacerbated by built (urban) environments.

The urban heat island (UHI) effect, a function of the urban environment, is defined as the temperature differential between the contiguous rural area and its related urbanized space. The UHI effect likely serves to magnify the lethality of EHEs. The effect, however, is not a straight forward and simple magnification. The UHI effect is complex and dependent upon a number of factors. The UHI effect stems from the lack of vegetation, low thermal conductivity and/or high heat capacity materials used in the built environment, and the urban canyon-like geometry. UHIs are typically spatially heterogeneous, with differing levels of heat intensity occurring within a city (aka micro-UHIs). Vulnerable groups spatially coincident with these micro-UHIs are thought to be at an even greater increased risk of heat-related mortality.

The spatial analysis of vulnerability, linking social and built environment variables to EHEs within urban areas, is limited. Investigators have demonstrated that warmer and more socially disadvantaged areas are more prone to heat-related deaths. But investigators have undertaken no direct physical measure of temperature. Furthermore, there has been no adequate measure of heat load or of the socioeconomic disadvantages of a given neighborhood in relation to UHI's or EHE's.

Previous approaches utilizing the Human Thermal Comfort Index (HTCI) suffer from a similar problem. While indicating a strong positive spatial relationship between heat stress and the percentage of poverty and minority, these approaches suffer from using estimated UHIs as well as from a lack of a direct accounting for socioeconomic factors. In essence, previous approaches fail in as far as they does not provide a true or useful mechanism with which to predict where the greatest concentrations of mortality and morbidity will occur within an urban environment during an EHE.

Cities are facing ever greater financial constraints upon their abilities to respond to social and environmental harms. Additionally, it is expected that EHEs will likely increase both in duration and intensity as a result of climate transformation. Taken together, these elements indicate a scenario that underscores the need to further understand the phenomena of extreme heat, identify at-risk populations and mitigate effects and impacts upon those populations. Cities must be able to better predict where their EHE response mechanisms must be concentrated to most effectively combat the mortality and morbidity caused by future EHEs. The enhanced ability to delineate the risk of morbidity and mortality at finer scales within urban environments will enable better and more cost effective concentration of mitigation efforts and preventative measures yielding improved medical and preventative responses and superior post EHE recovery.

Thus there remains a need for an improved, spatially specific method to identify populations at risk from EHE's. The present novel technology addresses this need.

SUMMARY OF THE INVENTION

The urban heat island effect during extreme heat events is coupled with socioeconomic indicators of vulnerability to enable the development of mortality and morbidity risk models with improved spatial specificity. Model development data is derived from reported urban mortality and morbidity values during an extreme heat event. Socioeconomic characteristics believed to be of importance are taken from existing studies on the vulnerability of populations to extreme heat. The urban heat island effect is mapped and broken into intensity levels over the area in question during the extreme heat event. A spatial analysis is performed determining the relative importance of any given socioeconomic characteristic in predicting the sensitivity of its representative sub population to an extreme heat effect under an urban heat island effect. A model utilizing the importance weighted socioeconomic characteristics and heat intensity levels as independent variables to predict the spatial distributions of extreme heat event mortality is created. One object of the present novel technology is to enhance the spatial specificity of extreme heat event mortality predictions to assist public health professionals. Other objects and advantages will become apparent from the following description.

BRIEF DESCRIPTION OF THE DRAWINGS

Like reference numbers and designations in the various drawings indicate like elements.

DETAILED DESCRIPTION

For the purposes of promoting an understanding of the principles of the invention and presenting its currently understood best mode of operation, reference will now be made to the embodiments illustrated and specific language will be used to describe the same. It will nevertheless be understood that no limitation of the scope of the invention is thereby intended, with such alterations and further modifications in the illustrated device and such further applications of the principles of the invention as illustrated therein being contemplated as would normally occur to one skilled in the art to which the invention relates.

The present novel technology was developed to improve urban response to EHE's. Consequently, the following examples and embodiments to reflect and reference a study area consisting of a large, urban area. This study environment was selected such that the large, urban area has experienced an extreme heat event. Furthermore, this particular urban area was selected in part because for the time of the extreme heat event there was available associated population data and landsat TM imagery data. As such, EHE's are naturally occurring and infrequent, and not inherently reproducible in a controlled laboratory environment, this study is frequently referenced herein. However, it should be kept in mind that the present novel technology is broadly applicable beyond the specific details and characteristics of the study embodiment referenced herein.

Figure 1A:
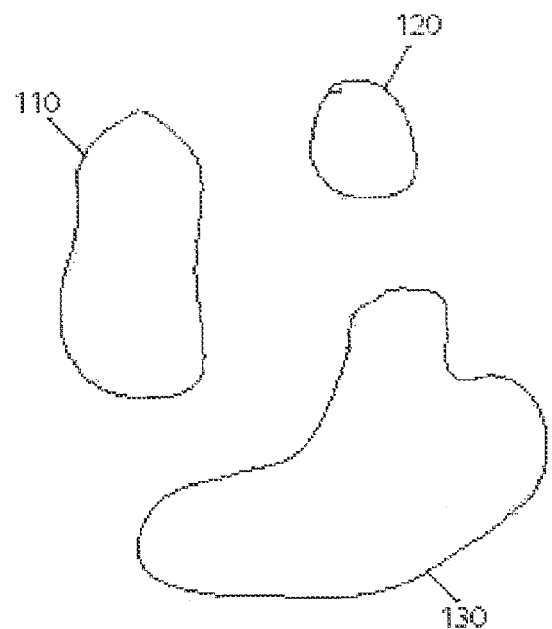
FIG. 1a is a sample spatial clustering based upon socioeconomic variables, as derived from block group data as obtained from census data.

FIG. 1a is a sample spatial clustering 100 based upon socioeconomic variables, as derived from block group data as obtained from census data. FIG. 1a presents a simplified view in order to facilitate understanding. Typically, the block group data is obtained from census data and corresponds to a uniformly sectioned area. As a non-limiting example, block groups could be based upon one hundred, two hundred, and three hundred square meter areas. Other block sizes are possible with granularity of the block sizes being determined as desired.

Typically, the spatial clustering based upon socioeconomic variables will have similar standard deviational ellipse results as standard deviational ellipses derived from heat related mortality data. Usually, the socioeconomic variables are grouped into cooperative files to assist in displaying the geographic extent of the variables' influence. In this sample spatial clustering 100, the areas 110, 120, and 130 represent areas of risk above a pre-determined threshold, based upon the socioeconomic variables.

Figure 1B:
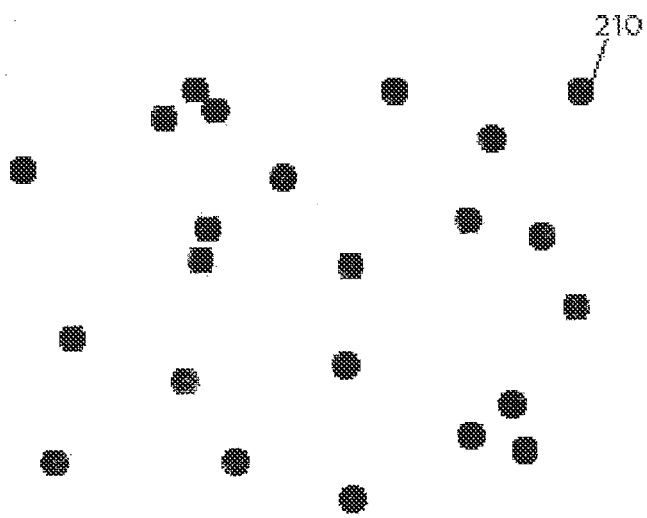
FIG. 1b is an example spatial distribution of heat related mortalities as might be experienced within an urban environment.

FIG. 1b is an example spatial distribution 200 of heat related mortalities as might be experienced within an urban environment. Within the example spatial distribution 200 of heat related mortalities, each dot represents a single mortality 210 within the urban environment.

Figure 1C:
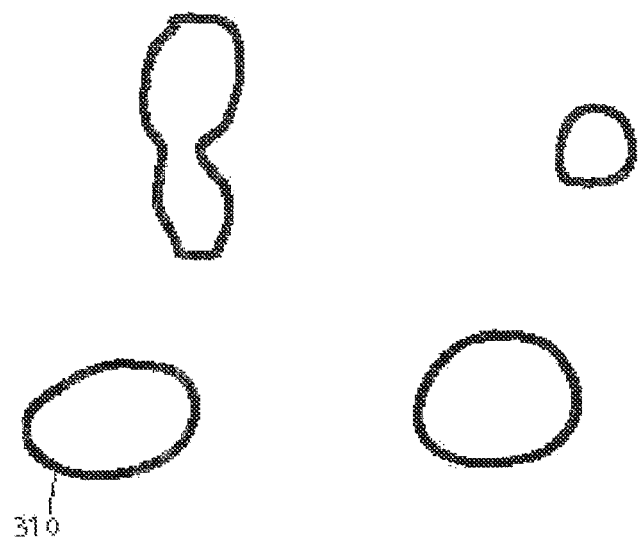
FIG. 1c is an example of the spatial distribution of an Urban Heat Island (UHI) effect as might be experienced within an urban environment.

FIG. 1c is an example of the spatial distribution 300 of an Urban Heat Island (UHI) effect as might be experienced within an urban environment. FIG. 1c presents a simplified view in order to facilitate understanding. In this simplified example, the enclosed areas represent an UHI effect such that the temperatures of the enclosed areas are a pre-determined threshold amount greater than the temperatures of the surrounding non-enclosed areas.

Figure 1D:
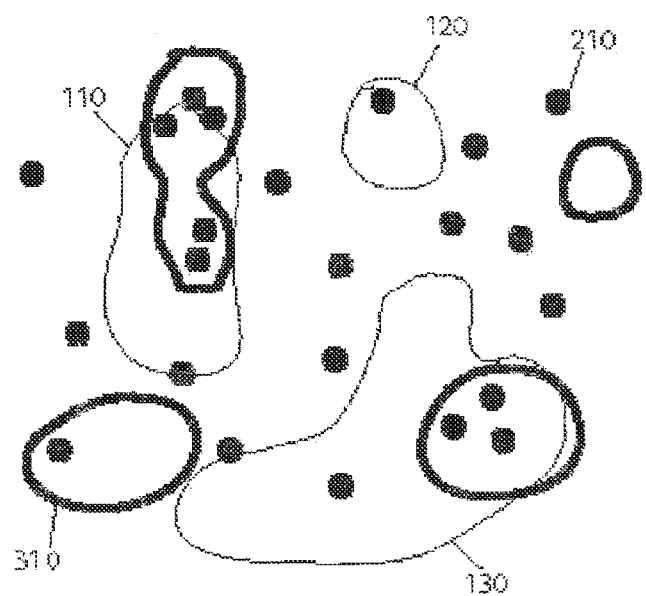
FIG. 1d is an example overlay of the spatial clustering based upon socioeconomic variables, spatial distribution of heat related mortalities, and spatial distribution of a UHI effect, and an overlay of FIG. 1a-1c.

FIG. 1d is an example overlay 400 of the spatial clustering based upon socioeconomic variables, spatial distribution of heat related mortalities, and spatial distribution of a UHI effect, and an overlay of FIG. 1a-1c. It provides a simplified visual demonstration of one implementation of how the processes described in this application served to identify areas of increased risk of mortality due to extreme heat events based upon socioeconomic variables and urban heat island effects.

Figure 2:
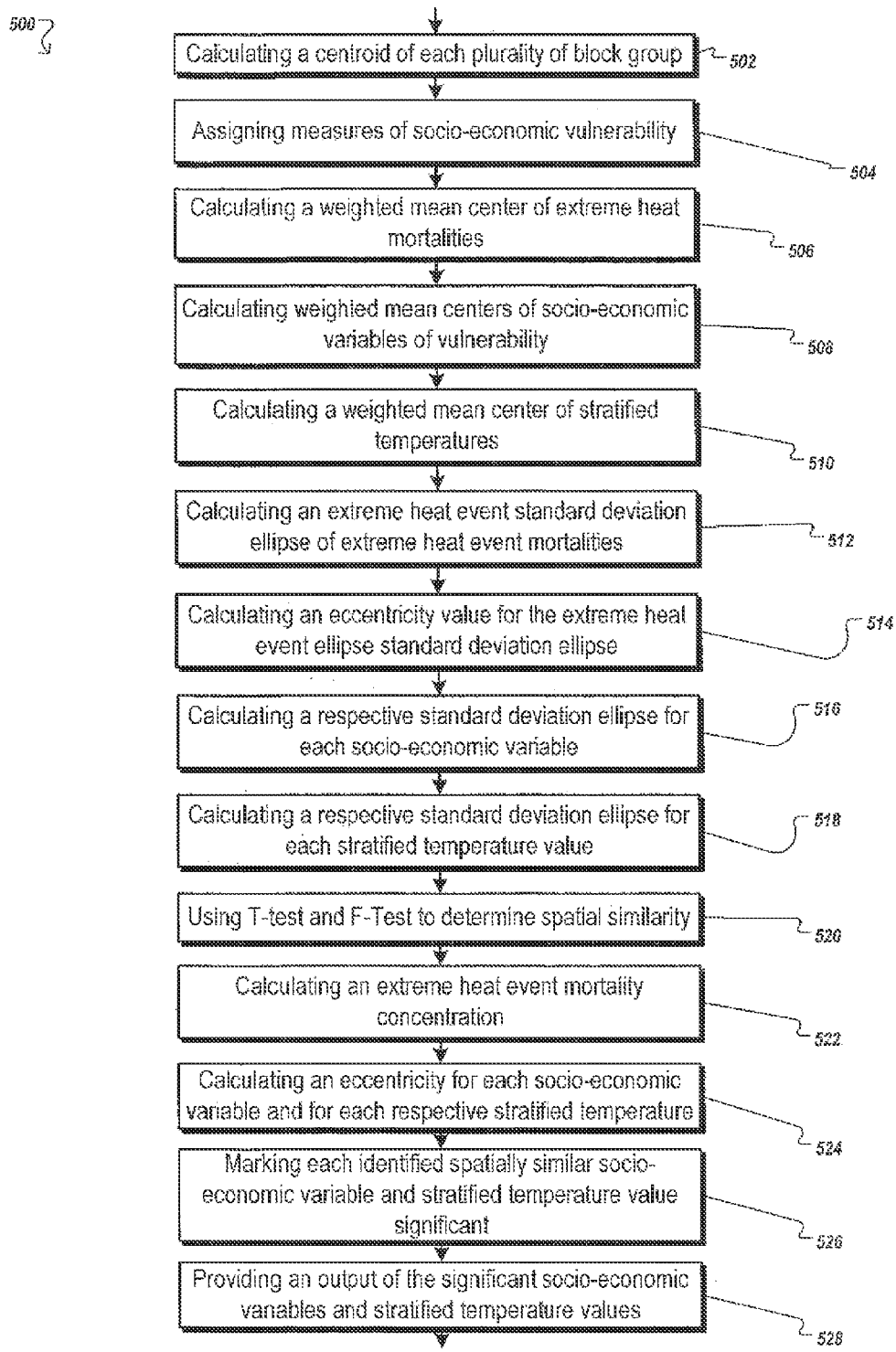
FIG. 2 is a diagram of an example process for determining a significance of a social economic variable of vulnerability within the context of an urban heat island effect, with respect to urban extreme heat event mortalities.

FIG. 2 is a diagram of an example of the process 500 for determining a significance of a social economic variable of vulnerability within the context of an urban heat island effect, with respect to urban extreme heat event mortalities. The process 500 starts with calculating a centroid of each plurality of block group (502). In some implementations, a block group is defined on the basis of population. The typical block group is about 1500 people. For example, a block group of a given number would likely occupy a larger area in a rural area than in an urban area. The centroid is typically defined as the mean of all points of interest within an area. For example, in some implementations the centroid can be the average of all point populations weighted by the respective population's local density.

Measures of socio-economic vulnerability, decedents, and stratified temperature are assigned to the centroid (504). The assignment is typically performed based upon being present within the same boundary as defined by the block group.

A weighted mean center of extreme heat event mortalities is calculated (506), typically by averaging the coordinates of all the points and providing a weight to each based on an attribute variable of interest. Using the respective centroids, the weighted mean centers of socio-economic variables of vulnerability are calculated (508). Similarly, a weighted mean center of stratified temperatures is also calculated using the centroids as points (510) as well as the weighted mean centers of socio-economic variables of vulnerability (212). In some implementations, after a weighted mean center is calculated, each point is then transformed into a different metric space referenced from the respective weighted mean center as described elsewhere in this application.

Using the weighted mean center, an extreme heat event standard deviation ellipse of extreme heat event mortalities is calculated (212). An eccentricity value for the extreme heat event standard deviation ellipse of the extreme heat event mortalities is calculated (214). Typically, this eccentricity value is calculated as the standard deviation along the x axis divided by the standard deviation along the y axis, as described elsewhere in this application. The eccentricity can be used to rotate the x and y graph such that the ellipse encompasses a maximum number of the extreme heat event mortalities. In a similar fashion, a respective standard deviation ellipse for each socio-economic variable is also calculated (518) as well as a respective standard deviation ellipse for each stratified temperature value, using the corresponding weighted mean center. In some implementations, the standard deviation along the x axis, the standard deviation along the y axis, the x and y axis weighted means and area can be used to quantitatively compare the spatial distribution of the variables.

T test and F-Test are used to determine spatial similarity (520) between the extreme heat event standard deviation ellipses and the respective standard deviation ellipses for each socio-economic variable and for each stratified temperature value. Using the T test and F-test, each socioeconomic variable and stratified temperature is compared to the extreme heat event standard deviation ellipses. In short, the extreme heat event standard deviation ellipses denote areas of interest and those variables that most closely mimic the extreme heat event standard deviation ellipse are considered to be those variables that are most spatially similar to the extreme heat event standard deviation ellipses. Those variables and stratified temperatures that are most spatially similar to the extreme heat event standard deviation ellipses are considered to be the most predictive.

An extreme heat event mortality concentration is calculated (522) for each standard deviation ellipse of a socioeconomic variable and/or stratified temperature value that has been shown to be spatial similar to the extreme heat event standard deviation ellipses. The concentration is arrived at by determining a total mortality for a standard deviation ellipse of the spatially similar socioeconomic variable or stratified temperature, and then dividing that total by the area of the standard deviation ellipse of the spatially similar socioeconomic variable or stratified temperature. Typically, the higher the concentration, the more significant the socioeconomic variable or stratified temperature when it comes to predicting extreme heat event mortalities.

Each identified spatially similar socioeconomic variable and stratified temperature value with an extreme heat event mortality concentration above a threshold and an eccentricity value within a predetermined range of the eccentricity of the extreme heat event mortality is identified and marked (526) as being significant in predicting extreme heat event mortalities. The marked socioeconomic variables and stratified temperature values are provided as output (528).

Figure 3:
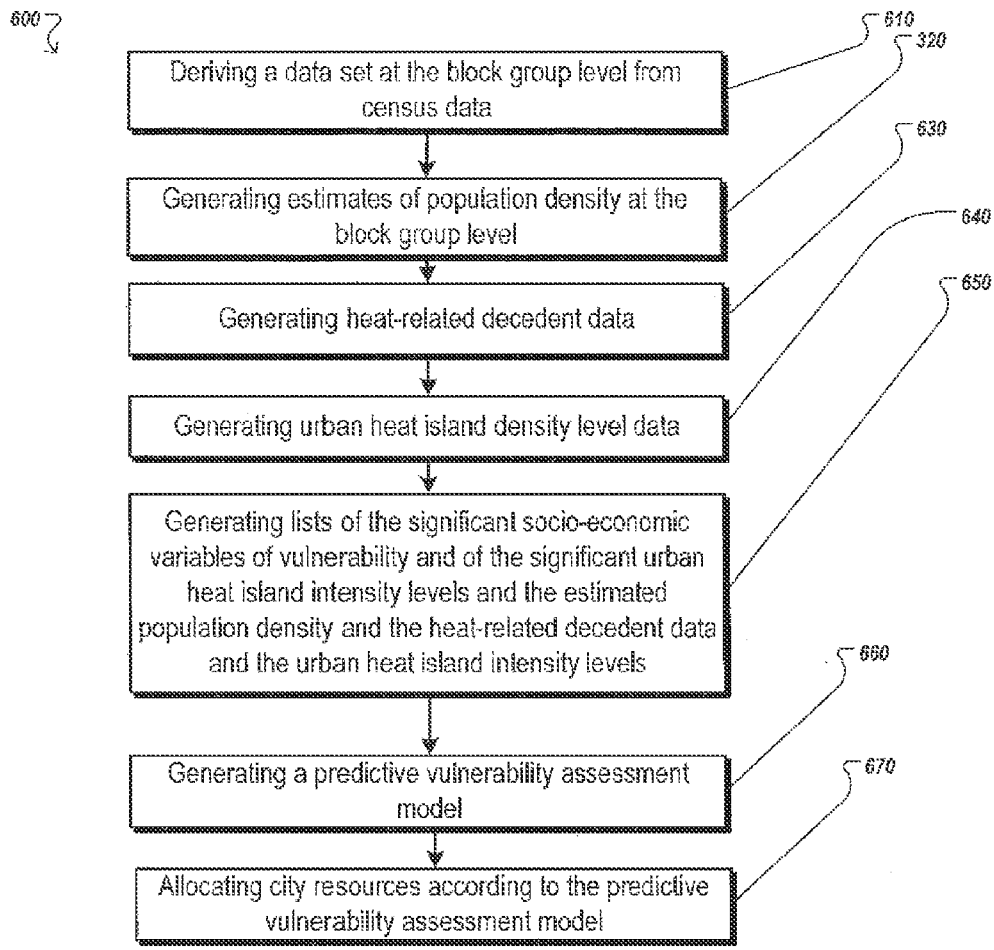
FIG. 3 is a diagram of an example process for generating a predictive vulnerability assessment model.

FIG. 3 is a diagram of an example process 600 for generating a predictive vulnerability assessment model. The generation process 600 begins by deriving a data set at the block group level from census data (610). The block group represents an area standardized partition on a grid map of an urban setting and wherein the data set further comprises groupings of population apportioned according to a plurality of predetermined vulnerability characteristics. For example, the grid map of an urban setting could be a population map of the urban setting.

Estimates of population density at the block group level are generated (620) and heat related decedent data is generated (630). Urban heat island density level data is generated (640) as described previously in this application. For example, urban heat island density level data is generated based upon temperature differentials between the contiguous rural area and its related urbanized space.

Lists of the significant socio-economic variables of vulnerability and of the significant urban heat island intensity levels from the data set at the block group level and the estimated population density at the block group level and the heat-related decedent data and the urban heat island intensity levels are generated (650). A process similar to the example process described in FIG. 2 can be used to determine the significant socio-economic variables of vulnerability and significant stratified temperature values.

A predictive vulnerability assessment model is generated (660) using the lists of the significant socio-economic variables of vulnerability and significant stratified temperature values. The predictive vulnerability assessment model can be generated through statistical means such as regression, through adaptive machine learning algorithms, and the like. City resources can then be allocated in an anticipatory manner according to the predictive vulnerability assessment model in response to an extreme heat event (670). For example, a large city, could distribute its limited extreme heat response equipment, personal, and mobile medical facilities based upon the predictive vulnerability assessment model.

Vulnerable Populations

Census data are derived at the block group level following the socio-economic characteristics of vulnerability (such as: Hispanic population, black population, Asian population, Native American population, Other race population, Age 65 and over, age 65 and living below poverty, age 5 and under, population living below poverty, low education, and the like) to extreme heat. Estimates of population are derived by normalizing the total population by the area of residential land use within each block group. The area of residential land use within a block group may be determined through any number of methods including satellite imagery, aerial survey, and the like. The area of residential land use is typically selected over other possible values, such as total block group area, because it provides a truer indicator of residential density within each block group. This is to say that it provides a more accurate description of the residential density within each block group. However, any convenient relevant value may be chosen Decedent Mapping Heat related fatalities for the area in question is obtained. The data is typically filtered to only include those deaths that occurred during the previously mentioned extreme heat event. The addresses of those qualified decedents are then assigned geographic identifies (hereafter geocoded). Additionally, the deaths within each block group are totaled to produce a dataset representative of block group level EHE mortality.

Urban Heat Island Mapping

Typically, the Landsat thermal mapping (hereafter TM) imagery is acquired for the time period in question. The thermal band of the image is then converted to an at-satellite brightness temperature per the following equation, $$T = \frac{K2}{\ln\left(\frac{K1}{LW} + 1\right)}$$

where T is an estimate of land surface temperature in Kelvin. K2 is the calibration constant for temperature in Kelvin and K1 is the constant for radiance in $mWcm^{2\mu m-1}$. $L_w$ is the spectral radiance in $mWcm^2$, calculated from the digital number values of the landsat TM thermal band.

Typically, T is then averaged by block group. This is done to determine the mean estimated land surface temperature per block group. The average T values are then uniformly stratified into the number of different levels desired.

Spatial Analysis

The typical spatial analysis method is the standard deviational ellipse (SDE). It is a well known method and highly suited for point patterns. The end result of this analysis is the assignment of a weight to each of the descriptive variables. For example, in the most simple case, the variables found to be highly descriptive of the data are assigned a weight of 1 (one) while those not found so are assigned a weight of 0 (zero).

The calculation of the SDE is reasonably uncomplicated and many current GIS applications allow for its use. The SDE first requires that the centroid of each block group be calculated and the demographic measures, decedents and T measures respectively be assigned. Typically, a weighted mean center of the point set will also be calculated as part of the calculation of the SDE. Use of the weighted mean center provides a better descriptor of vulnerability than a nonweighted mean center. The weighted mean center is obtained by averaging the coordinates of all the points and providing a weight to each based on an attribute variable of interest. After the mean center is calculated, each point is then transformed into a different metric space referenced from the mean center. The equation for this transformation is $X'_j = X_j - X_{weighted\ mean\ center}$ with the Y transformation essentially being the same equation. The angle of rotation from the transformed points is calculated by $$\tan\theta = \left(\sum_{i=1}^{n} X_i'^2 - \sum_{i=1}^{n} Y_i'^2\right) + \sqrt{\left(\sum_{i=1}^{n} X_i'^2 - \sum_{i=1}^{n} Y_i'^2\right) + 4 \frac{\left(\sum_{i=1}^{n} X_i' Y_i'\right)^2}{2\sum_{i=1}^{n} X_i' Y_i'}}$$

The standard distance on X and Y are then calculated as $$\delta_X = \sqrt{\frac{\left(\sum_{i=1}^{n}(X_i'\cos\theta - Y_i'\sin\theta)\right)^2}{n}}$$

$$\delta_Y = \sqrt{\frac{\left(\sum_{i=1}^{n}(X_i'\sin\theta - Y_i'\cos\theta)\right)^2}{n}}$$

$\theta_X$, $\theta_Y$, $X_{weighted\ mean\ center}$, $Y_{weighted\ mean\ center}$, and area are used to quantitatively compare the spatial distributions of all the variables. Standard T-test and F test are used to determine the levels of spatial similarity. This in turn indicates the importance of the actual variables when describing the real data.

Additional evaluations of the variables and their importance in describing the data are achieved through evaluation of concentration and eccentricity. A death concentration value is calculated within the spatial distributions of T. Eccentricity values are calculated as $\theta_X/\theta_Y$. The concentration value describes the level of concentration of the spatial phenomena and the eccentricity indicates the polarity of the point distribution within the ellipse. With respect to a variable, the greater the concentration of death and/or smaller eccentricity, the greater coverage of that variable's descriptive capability with respect to the actual data.

Modeling

Typically, a multiple regression modeling technique is used. First, all non-zero weighted variables are interpolated to standard sized cells covering the study area using a kernel density function. After calculation of the kernel density, the mean value per block group residential area is calculated. The non-zero weighted variables are evaluated for multi-collinearity. If needed, any collinearity is removed. A mapping of the kernel density of real death points (the actual data) is performed.

A multiple regression utilizing the non-zero weighted variables and T as the independent variables is performed, with density of EHE death being the dependent variable. Outputs of the regression are generated, forming standardized predictive values of risk. These values are mapped at the census-block group level with decedent locations as the validation layer. The standard $R^2$ test (a test that determines what fraction of the total squared error is attributed to the model) or the like may be used to determine the effectiveness of the model in explaining the variation of the dependent variable.

Following a significant $R^2$ value, the models outputs can be viewed as spatially predictive values of future risk. Maps depicting spatial variation of risk, typically through a 3-D map with the Y axis representative of relative risk or the like of the city can be created. In the event of an extreme heat event or a predicted extreme heat event, health care professionals concentrate intervention measures into areas denoted as at high risk.

While the invention has been illustrated and described in detail in the foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the invention are desired to be protected.

What is claimed is:

1. A method for determining a significance of a social economic variable of vulnerability within the context of an urban heat island effect, with respect to urban extreme heat event mortalities comprising:
   (a) calculating, by a computer, a centroid of each plurality of block group;
   (b) assigning, by the computer, measures of socio-economic vulnerability, decedents, and stratified temperature to the centroid;
   (c) calculating, by the computer, a weighted mean center of extreme heat event mortalities;
   (d) calculating, by the computer, weighted mean centers of socio-economic variables of vulnerability using the respective centroids as points;
   (e) calculating, by the computer, a weighted mean center of stratified temperatures using the respective centroids as points;
   (f) calculating, by the computer, an extreme heat event standard deviation ellipse of the extreme heat event mortalities, using the weighted mean center as the origin;
   (g) calculating, by the computer, an eccentricity value for the extreme heat event standard deviation ellipse of the extreme heat event mortalities;
   (h) calculating, by the computer, a respective standard deviation ellipse for each socio-economic variable;
   (i) calculating, by the computer, a respective standard deviation ellipse for each stratified temperature value using the corresponding weighted mean center;
   (j) using, by the computer, T-test and F-test techniques to determine spatial similarity between the respective extreme heat event standard deviation ellipses and the respective standard deviation ellipses for each socio-economic variable and for each stratified temperature value;
   (k) calculating, by the computer, an extreme heat event mortality concentration within each standard deviation ellipse for each socio-economic variable and for each respective stratified temperature value shown to be spatially similar as a number of extreme heat event mortalities coincident within the standard deviation ellipse divided by the area of the standard deviation ellipse;
   (l) calculating, by the computer, an eccentricity for each respective socio-economic variable and for each respective stratified temperature value identified to be spatially similar;

(m) marking, by the computer, each identified spatially similar socio-economic variable and stratified temperature value significant where the extreme heat event mortality concentration is above a predetermined threshold and the eccentricity value is within a predetermined range of the eccentricity of the extreme heat event mortality; and (n) providing, by the computer, an output of the significant socio-economic variables and stratified temperature values.

2. The method of claim 1 further comprising:

using, by the computer, the output of the significant socio-economic variables and stratified temperature values to generate a risk model for modeling a spatial specificity of at-risk subpopulations from an extreme heat event within an urban setting, wherein the at-risk subpopulations are those subpopulations with a risk greater than a selected threshold.

3. The method of claim 2 wherein using the output of the significant socio-economic variables and stratified temperature values to generate a risk model for modeling a spatial specificity of at-risk subpopulations from an extreme heat event within an urban setting further comprises:

(a) deriving a data set at the block group level from census data, wherein a block group represents an area standardized partition on a grid map of an urban setting and wherein the data set further comprises groupings of population apportioned according to a plurality of predetermined vulnerability characteristics;

(b) generating estimates of population density data at the block group level;

(c) generating heat-related decedent data;

(d) generating urban heat island intensity level data;

(e) generating lists of the significant socio-economic variables of vulnerability and of the significant urban heat island intensity levels from the data set at the block group level and the estimated population density at the block group level and the heat-related decedent data and the urban heat island intensity levels;

(f) generating a predictive vulnerability assessment model using the significant social economic variables of vulnerability and the significant urban heat island intensity levels and the heat-related decedent data; and (g) allocating city resources according to the predictive vulnerability assessment model in response to an extreme heat event.

\* \* \* \* \*